INVENTOR.
DONALD C. FISH

Sept. 12, 1967 JAMES E. WEBB 3,340,713
ADMINISTRATOR OF THE NATIONAL AERONAUTICS
AND SPACE ADMINISTRATION
SPIN FORMING TUBULAR ELBOWS
Filed Feb. 11, 1965 2 Sheets-Sheet 2

INVENTOR.
DONALD C. FISH

BY

ATTORNEYS

United States Patent Office 3,340,713
Patented Sept. 12, 1967

3,340,713
SPIN FORMING TUBULAR ELBOWS
James E. Webb, Administrator of the National Aeronautics and Space Administration, with respect to an invention of Donald C. Fish, Arlington, Tex.
Filed Feb. 11, 1965, Ser. No. 432,028
4 Claims. (Cl. 72—83)

ABSTRACT OF THE DISCLOSURE

An apparatus and method for spin forming a tubular elbow about a curved cylindrical mandrel by rotating the mandrel with the blank material in a specific manner so as to cause a roller to thin the blank material along the mandrel.

The invention described herein was made in the performance of work under a NASA contract and is subject to the provisions of Section 305 of the National Aeronautics and Space Act of 1958, Public Law 85-568 (72 Stat. 435; 42 U.S.C. 4257).

This invention relates to an apparatus and method for cold-forging tubular elbows.

A need has existed for a long time for a high strength, large, tubular elbow of good quality. The prior methods and apparatus for making large tubular elbows by bending, seam welding, explosive forming, and the like produced an elbow which was not uniform in thickness, had irregular stress distributions, and varied in many factors from one elbow to the next.

Accordingly, it is an object of the present invention to provide means for making tubular elbows of higher strength, closer tolerances, and more uniform thickness than heretofore obtainable.

Another object is to provide an apparatus and method for spin forming tubular elbows.

These and other objects are accomplished by mounting a tubular blank, from which the elbow is to be forged, on a mandrel having a curved bend. One or more rollers are forced into the material of the blank at one end while the mandrel is rotated about an axis perpendicular to a plane passing through the rollers' contact points and center of curvature for the curved bend. As the blank is thinned beneath the rollers and cold-flowed to extend along the mandrel, the mandrel is passed axially between the rollers and simultaneously tilted to keep its spin-axis, at the rollers, perpendicular to the plane passing through the rollers' contact points and the center of curvature for the curved bend. The blank material having been cold-flowed to extend a desired distance around the bend in the mandrel, the finished elbow is removed from the mandrel. The wall thickness of the elbow is determined by the spacing between the rollers and mandrel.

The apparatus itself comprises a table rotatable around a vertical axis. Spaced vertical supports are mounted on the table and these in turn pivotally mount a swing plate. The hinge line of the swing plate passes through the center of bend or curvature of the mandrel (i.e., the center about which the bend radius is swung). Drive means such as a gear segment and worm gear are provided for tilting the swing plate. The rotation axis of the table passes through the axial center of the mandrel where the same is intersected by a plane passing between the roller contact point or points and the center of curvature of the mandrel bend. The rotation axis of the table is perpendicular to this plane.

Figure 1:
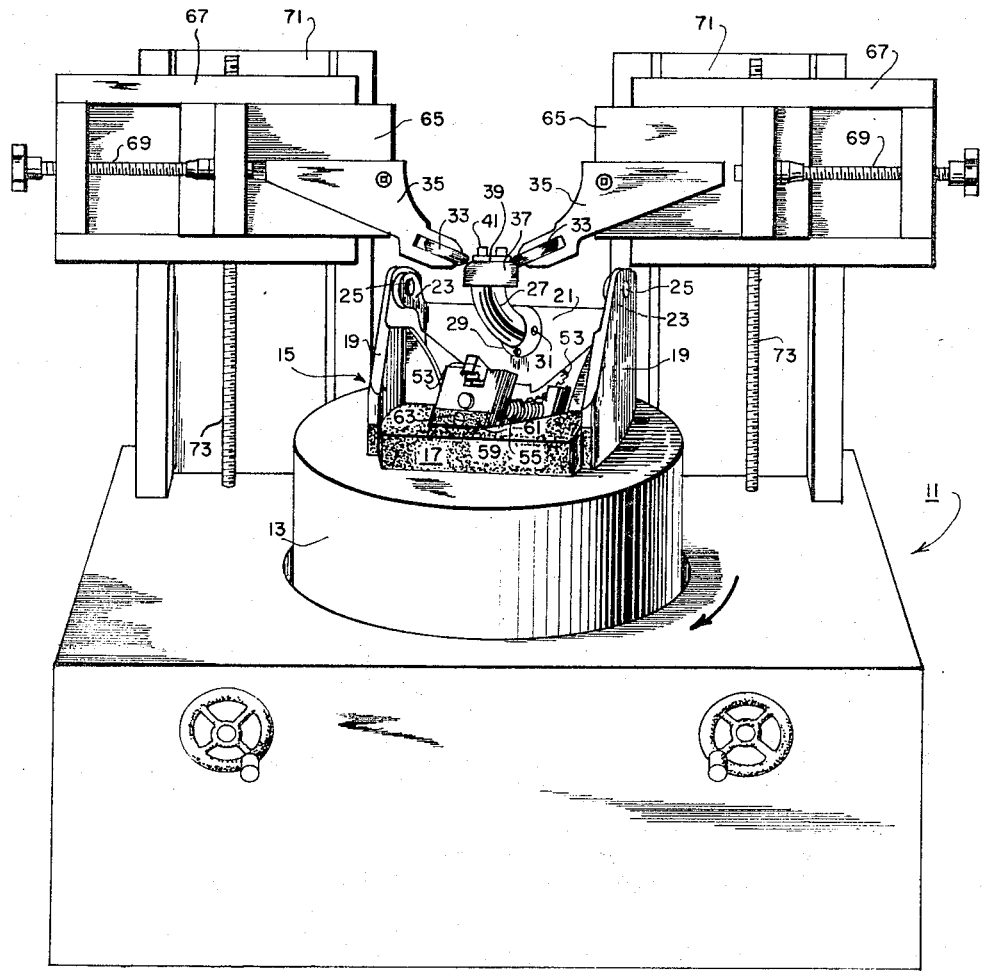
Figure 2:
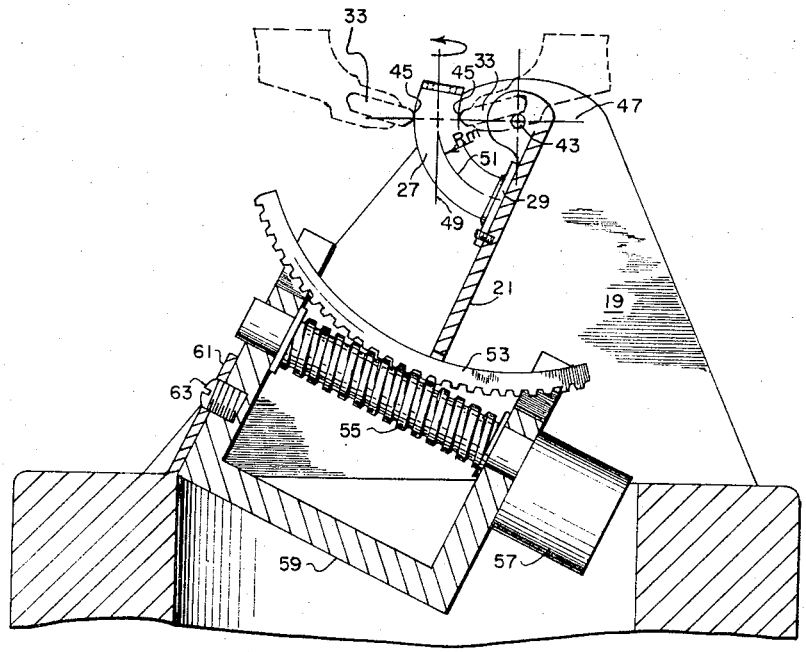
Figure 3:
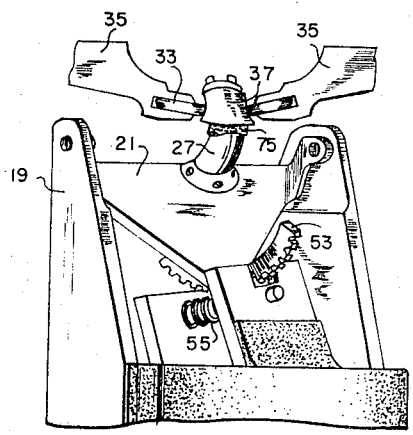

This will be more readily understood by the following detailed description of the invention when taken together with the accompanying drawings in which:

FIGURE 1 is an elevational view of an apparatus of the present invention;
FIGURE 2 is a partial elevational cross-sectional view showing in detail the swing plate of the apparatus of FIGURE 1; and
FIGURE 3 is a partial elevation view showing the spin forming of a tubular elbow.

Referring now to the drawings, and in particular to FIGURE 1, which shows a conventional spin machine 11 having a rotary table 13. Upon the rotary table 13 sets the spin forming apparatus 15 which has a base 17 with two vertical supports 19. A substantially triangular swing plate 21 is pivotally mounted between the supports 19. The swing plate 21 has a perpendicular projecting ear 23 at each corner adjacent its upper edge which is secured by a pivot pin 25 to the supports 19.

A curved, cylindrical mandrel 27 which corresponds in shape to a finished elbow has a base plate 29 which is secured to the swing plate 21 adjacent the upper edge by screws 31.

Two forging rollers 33 are symmetrically located about the mandrel 27. The rollers 33 are supported on arms 35 which are adjustably supported by the spin machine 11.

In operation, a tubular blank material 37 is fitted over the distal end of the mandrel 27. The blank material 37 is provided with an end cap 39 which is fastened to the mandrel with cap screws 41. The mandrel 27 is rotated between the rollers 33, as described in more detail hereafter, so the rollers 33 will cold forge the blank material 37 along the bare mandrel 27.

To accomplish this result, the pivot or hinge line of the swing plate, as illustrated best in FIGURE 2, passes through the center of bend 43 of the mandrel 27, and, thus, the finished elbow (i.e. the center about which the bend radius Rm is swung). Also, the rollers 33 are positioned by the arms 35 so their contact points 45 will be in a plane 47 which passes through the center of bend 43 of the mandrel 27. Thus, when the mandrel 27 is rotated upward between the rollers 33, the contact points 45 will remain equidistant from the mandrel surface.

The mandrel 27 is rotated about the vertical axis 49 of the rotatable table 13 (see FIGURES 1 and 2) which is perpendicular to the plane 47 passing through the roller contact points 45 and the center of bend 43 (or curvature) of the curved mandrel 27. The major axes of the rollers 33 are tilted slightly to this plane 47 so as to enable the blank material 37 to be forged downwardly on the mandrel 27 as it is rotated upwardly between the rollers 33 in the manner shown by FIGURE 3.

The apparatus 15 is positioned on the rotatable table 13 so that its vertical rotational or spin axis 49 passes through the axial center 51 of the mandrel 27 at the same point it is intersected by the plane 47 passing through the roller contact points 45 and the center of bend 43 for the mandrel 27. Thus, the rotation of the table 13 will cause the mandrel 27 to rotate about the rotational axis 49 and yet keep its surface equidistant from the rollers 33.

The lower end of the swing plate 21 is secured by suitable means to a gear segment 53 which has the same center of curvature 43 as the mandrel 27. The gear segment 53 is rotated about its center of curvature 43 by a worm gear 55 arrangement driven by a controlled electric motor 57. The worm gear 55 and motor 57 is supported on a channel frame 59 which is secured within a recess within the apparatus base 17. The base 17 has a tilted flange 61 which holds the channel frame 59 by a screw 63.

It is apparent that as the worm gear 55 rotates, the gear segment 53 will cause the swing plate 21 to pivot and axially push the mandrel 27 between the rollers 33.

As shown in FIGURE 1, each arm 35 supporting a roller 33 is cantilevered out on a sliding member 65 which is guided and confined by a horizontal track-like member 67. A turn screw 69 enables the sliding member 65 to be positioned in the desired horizontal direction.

The horizontal track-like member 67 is in turn slidably supported on a vertical track-like member 71 and similarly controlled by another turn screw 73 arrangement to position the arm 35 in the desired vertical direction.

Operation

A short, suitably designed, tubular blank material 37 having an integral end cap 39 is placed upon the distal end of the mandrel 27 and secured thereto by cap screws 41.

The spin table 13 is rotated at a suitable speed, and the rollers 33 by adjustment of the turn screws 69 and 73 of the slidable arms 65 are forced into the blank material 37 so as to cause the blank material 37 to thin beneath the rollers 33 and cold-flow along the mandrel 27. Simultaneously, the worm gear 55 is rotated by the electric motor 57 so as to cause the swing plate 21 to pivot and push the mandrel 27 slowly and axially between the rollers 33. Several passes of the rollers 33 may be made to cause the blank material 27 to cold-flow the entire length of the mandrel. FIGURE 3 illustrates the blank material extending along the mandrel 27. The finished elbow is then removed from the mandrel 27.

It has been found to be advantageous to lubricate the mandrel by spraying with Molycote and then coating with Lubri-Plate before the spinning operation. FIGURE 3 illustrates the coating of Lubri-Plate 75 on the mandrel 27.

Thus, it is apparent that a novel method and apparatus has been disclosed for spin forming tubular elbows and thereby achieving a higher ultimate strength and closer tolerances, and more uniform thickness than heretofore obtainable.

Obviously, many modifications and variations of the present inventions are possible in light of the above teachings. It is, therefore, to be understood that within the scope of the appended claims the inventions may be practiced other than as specifically described.

What is claimed is:

1. An apparatus for spin forging tubular elbows, comprising:
    (a) a table rotatable around a vertical axis;
    (b) spaced vertical supports mounted on said table;
    (c) a swing plate pivotally mounted between said vertical supports;
    (d) a mandrel having a curved bend secured at one end to said swing plate;
    (e) roller means for cold forging a metal blank adapted to be positioned on the distal end of said mandrel;
    (f) said roller means and mandrel being positioned so a plane passing through the metal blank contact point for said roller means and the center of curvature for the curved bend of said mandrel will perpendicularly intersect the vertical rotational axis of said table along the mandrels' longitudinal axis; and
    (g) drive means for pivoting said swing plate in a controlled manner.

2. An apparatus for spin forging tubular elbows, comprising:
    (a) a supporting structure adapted to be rotated about a central vertical axis;
    (b) a swing plate;
    (c) means for pivotally mounting said swing plate upon said supporting structure so said swing plate will pivot about a hinge line;
    (d) an elongated cylindrical mandrel having a circular bend corresponding to an elbow to be spin forged.
    (e) means for securing one end of said mandrel to said swing plate so that the swing plate hinge line passes through the radius center for the bend of said mandrel;
    (f) roller means for forging a metal blank positioned on the distal end of said mandrel; and
    (g) drive means for tilting said swing plate so said mandrel will be rotated about the hinge line for said swing plate.

3. An apparatus for spin forging tubular elbows, comprising:
    (a) a supporting structure adapted to be rotated about a vertical axis;
    (b) an elongated cylindrical mandrel having a curved bend corresponding to an elbow to be spin forged;
    (c) means for pivotally mounting one end of said mandrel upon said supporting structure about a hinge line which passes through the radius center for the bend of said mandrel; and
    (d) roller means for forging a tubular metal blank positioned over the distal end of said mandrel;
    (e) said vertical axis, about which said supporting structure rotates, passes through the axial center of the mandrel where the same is intersected by a plane passing through a point where said roller means is adapted to contact the tubular metal blank and the radius center for the bend of said mandrel;
    (f) said vertical axis being perpendicular to said plane.

4. A method of spin forging tubular elbows, comprising:
    (a) mounting a tubular blank material upon a cylindrical mandrel having a curved bend corresponding in shape to the finished elbow;
    (b) forcing a roller into said blank material at one end so it will thin beneath the roller and extend along the mandrel;
    (c) and simultaneously rotating said mandrel about a spin axis which passes through the axial center of the mandrel where the same is intersected by a plane drawn between the roller contact point with the blank material and the center of curvature for the curved bend of the mandrel, said spin axis being perpendicular to said plane;
    (d) and simultaneously pivoting said mandrel about the center of curvature for the curved bend so the rollers will cold forge the blank material to form a complete elbow.

References Cited

UNITED STATES PATENTS

| | | | |
|---|---|---|---|
| 843,518 | 2/1907 | Clarke | 72—83 |
| 1,120,271 | 12/1914 | Buescher | 72—117 |
| 1,500,261 | 7/1924 | Page | 72—82 |
| 1,812,523 | 6/1931 | Fantz | 29—157 |
| 1,962,510 | 6/1934 | Kellogg | 29—157 |
| 2,547,110 | 4/1951 | Bonnett et al. | 72—115 |
| 3,109,400 | 11/1963 | Paulton | 72—83 |

RICHARD J. HERBST, *Primary Examiner.*